United States Patent [19]

Miyata et al.

[11] Patent Number: 5,173,155

[45] Date of Patent: Dec. 22, 1992

[54] VACUUM BOILER TYPE EVAPORATOR

[75] Inventors: Yoshiaki Miyata, Yokohama; Akio Seta, Misato; Nobuhiko Tsui, Tokyo; Hiroshi Kujirai, Yokohama; Youji Satoh, Mino; Hitonobu Shotani, Amagasaki; Kazuya Sahara, Sanda; Yoshimichi Ikeda, Daito, all of Japan

[73] Assignees: Tokyo Gas Co., Ltd, Tokyo; Sumitomo Precision Products Co., Ltd., Hyogo, both of Japan

[21] Appl. No.: 712,740

[22] Filed: Jun. 10, 1991

[30] Foreign Application Priority Data

Sep. 28, 1990 [JP] Japan .................................. 2-261008
Nov. 30, 1990 [JP] Japan .................................. 2-338569

[51] Int. Cl.$^5$ .............................................. B01D 3/10
[52] U.S. Cl. ........................ 202/205; 159/DIG. 16; 165/113; 202/185.1; 202/188; 203/94; 203/98
[58] Field of Search .................... 203/91, 94, 98; 159/901, DIG. 16; 202/205, 185.1, 188; 165/111, 113; 261/DIG. 10; 196/114, 138

[56] References Cited

U.S. PATENT DOCUMENTS

| | | | |
|---|---|---|---|
| 2,682,499 | 6/1954 | Thurman | 202/205 |
| 3,214,352 | 10/1965 | Wells | 202/205 |
| 3,248,305 | 4/1966 | Williamson | 202/205 |
| 3,325,376 | 6/1967 | Eckert | 202/158 |
| 3,558,438 | 1/1971 | Schoenbeck | 202/205 |
| 3,577,320 | 5/1971 | Randell | 202/205 |
| 3,803,001 | 4/1974 | Carnavos | 202/205 |
| 4,004,432 | 1/1977 | Kong et al. | 62/262 |
| 4,347,671 | 9/1982 | Dias et al. | 34/15 |
| 4,394,139 | 7/1983 | Board | 55/20 |
| 4,509,591 | 4/1985 | Kals | 165/122 |
| 4,929,312 | 5/1990 | Westcott | 202/205 |

FOREIGN PATENT DOCUMENTS 4708377 11/1977 Japan .
266787 1/1987 Japan .
24500387 10/1987 Japan .

Primary Examiner—Virginia Manoharan
Attorney, Agent, or Firm—Watson, Cole, Grindle & Watson

[57] ABSTRACT

A vacuum boiler evaporator includes a sealed vacuum boiler vessel, a sealed vacuum condenser vessel which contains a partition that divides it into a first chamber and a second chamber that functions as a noncondensible gas collector, a conduit which connects the vacuum boiler vessel with the first chamber of the vacuum condenser vessel, a plurality of heat transfer tubes which extend through the first chamber and into the second chamber, and a return pipe which extends from the second chamber to the vacuum boiler vessel.

2 Claims, 1 Drawing Sheet

VACUUM BOILER TYPE EVAPORATOR

BACKGROUND OF THE INVENTION

1. Field of the Invention

The present invention relates to a reduced pressure or vacuum boiler type evaporator and in particular, to an evaporator including a vacuum boiler vessel and a condenser vessel arranged in a separate fashion, with means for collecting noncondensable gas so as not to deteriorate heat exchange effect.

2. Description of the Related Art

LNG evaporators include an open rack type evaporator wherein sea water as a heating medium is brought into contact with an array of vertical heat transfer tubes so as to increase the temperature of liquefied natural gas (LNG) to change from its liquid phase to its gaseous phase.

Another type of evaporator uses a burner as a heating source. A heat exchanger is immersed in a water vessel. The burner provides high temperature combustion gas below the heat exchanger. Water is used as an intermediate heating medium to increase the temperature of LNG. LNG is then vaporized to natural gas (NG).

However, such type of evaporator often suffers from malfunction of the burner or the burner fails to ignite fuel as it is placed in the water vessel. The heat exchanger is designed to accommodate vigorous circulating water. However, this results in complication of the heat exchanger and thus, in an increase in its production cost. A further problem is that large blower and motor are required to produce and maintain the stirring water.

A vacuum boiler also uses heat by means of a burner (see Japanese patent publication No. 47083/77, Japanese laid-open patent publication No. 245003/87 and Japanese patent publication No. 2667/87).

A typical vacuum boiler is illustrated in FIG. 3 and includes a vacuum vessel 1 within which water 2 as a heating medium is contained, a burner pipe 4 extending from the lower portion of the vacuum vessel 1 and adapted to transmit heat from a burner 3 to the water 2, and a heat transfer tubes 5 extending into the upper portion of the vacuum vessel 1. The water 2 is boiled under vacuum and vaporized to steam. Heat transfer of steam condensation is used to increase the temperature of fluid flowing through the heat exchange pipe 5. The vacuum boiler can be applied in various ways such as a hot water feed boiler or a heater.

When such a vacuum boiler is used as a low temperature fluid or LNG noncondensable gas results in a substantial decrease in the capability of the boiler.

Referring specifically to FIG. 3, the heat transfer tubes 5 is coupled to a LNG feed pipe 6, and the vacuum boiler functions as a LNG evaporator. Noncondensable gas may results in a decrease in the effectiveness of heat transfer between steam and LNG. Particularly, when a considerable amount of noncondensable gas is attached to the surface of the heat transfer tubes 5, ice is produced on its surface to deteriorate heat transfer between steam and LNG. LNG can not completely be vaporized, and a mixture of gas and low temperature liquid is disadvantageously delivered from the evaporator.

To this end, a vacuum pump 7 is required to remove noncondensable gas from the vacuum boiler type evaporator.

Accordingly, it is an object of the present invention to provide a vacuum boiler type evaporator which cooperates with a vacuum pump to effectively remove noncondensable gas or prevent attachment of noncondensable gas to the surface of a heat exchange pipe which may, otherwise, deteriorate the capability of the evaporator.

SUMMARY OF THE INVENTION

In order to achieve the foregoing object, according to a first embodiment of the invention, there is provided a vacuum boiler type evaporator comprising a sealed vacuum boiler vessel having a lower, tubular portion in which water is contained, and an upper portion in which a steam chamber is defined, a sealed vacuum condenser vessel including a set of heat transfer types into which liquefied natural gas is introduced from outside of the evaporator, heating means for heating the water in the vacuum boiler vessel, a conduit for feeding steam from the vacuum boiler vessel to the condenser vessel, a condensate return pipe for delivering condensate from the condenser vessel to the vacuum boiler vessel, and collector means for removing noncondensable gas from the condenser vessel.

Also, in order to achieve the object, according to a second embodiment of the invention, the collector means of the first embodiment is in the form of a heat exchanger placed in the condensate return pipe and adapted to collect the noncondensable gas.

Also, in order to achieve the object, according to a third embodiment of the invention, the collector means of the first embodiment includes a noncondensable gas collector provided in said condenser vessel and adapted to collect the noncondensable gas. The noncondensable gas collector includes a plurality of heat exchanger pipes projecting from the rest of the heat transfer tubes.

Also, in order to achieve the object, according to a fourth embodiment of the invention, the heating means as set forth in any of the first to third embodiments includes a burner.

In the vacuum boiler type low temperature or LNG evaporator of the present invention, the vacuum boiler vessel and the condenser vessel are separate from one another and interconnected by the conduit. Further, the condensate return pipe extends between the condenser vessel and the lower portion of the boiler vessel, and another heat exchanger is provided in the condensate return pipe to collect noncondensable gas. Alternatively, some of the heat exchange pipes may project from the rest of the pipes. Steam is fed from the steam conduit to the heat exchange pipes, and the extended, U-shaped heat exchange pipes function to collect noncondensable gas contained in the steam.

By this arrangement, noncondensable gas is no longer settled in the heat transfer tubes. Heat exchange can thus be effected as it should be, and heat can be transferred without loss.

Gas settled in additional heat exchanger of the noncondensable gas collector may be cyclically discharged from the evaporator. During each cycle, the majority of the heat exchange pipes can effect heat exchange so as to maintain the heat transfer coefficient and provide stable heat exchange.

BRIEF DESCRIPTION OF THE DRAWINGS

For a better understanding of the present invention, reference may be made to the following description of preferred embodiments when taken in conjunction with the accompanying drawings, in which.

DESCRIPTION OF THE PREFERRED EMBODIMENTS

Figure 1:
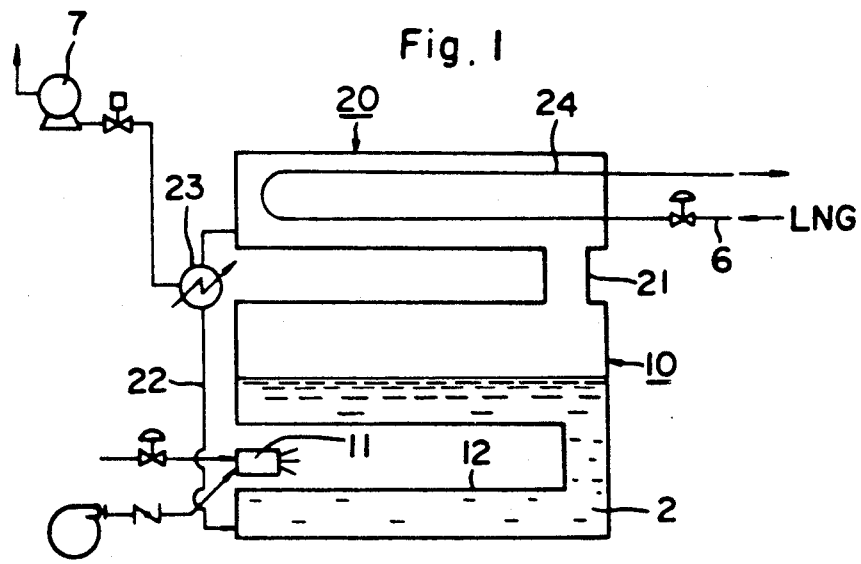
FIG. 1 is a schematic view of a vacuum boiler type evaporator according to a first embodiment of the present invention.
Figure 2:
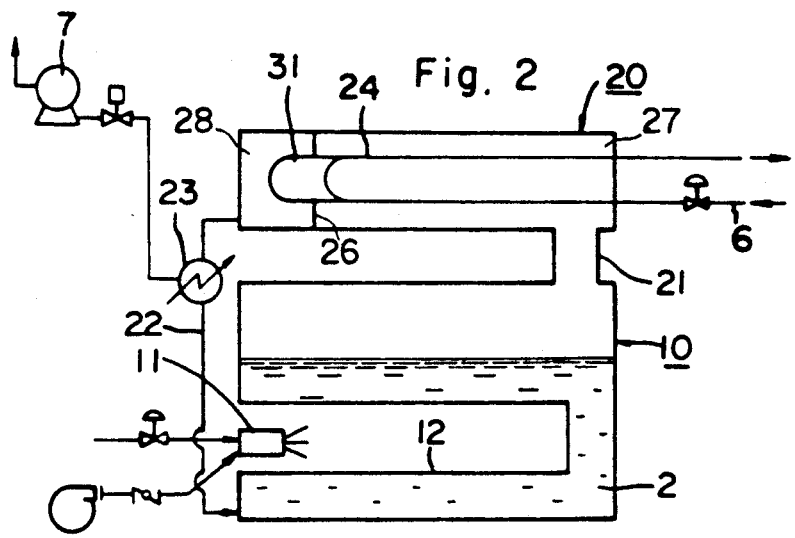
FIG. 2 is a schematic view of a vacuum boiler type evaporator according to a second embodiment of the present invention.
Figure 3:
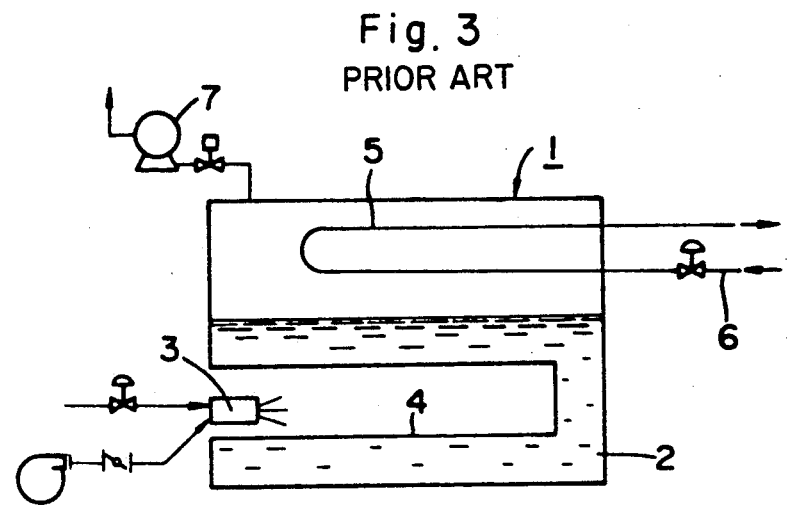
FIG. 3 is a schematic view of a conventional vacuum boiler.

The present invention will now be described by way of example with reference to FIGS. 1 and 2. FIGS. 1 and 2 show the structure of first and second embodiments of the invention, respectively. In FIGS. 1 and 2, like reference numerals designate like parts, and a set of thermally conductive pipes is simply referred to as a pipe.

A first embodiment of the invention will be described with reference to FIG. 1.

As shown in FIG. 1, a reduced pressure or vacuum boiler type evaporator includes a vacuum boiler vessel 10 and a condenser vessel 20 connected to the boiler vessel 10. Wafer 2 is contained in the vacuum boiler vessel 10 and serves as a heating medium. In order to reduce the pressure of the boiler vessel down to a predetermined level blow ambient pressure, air is removed from the vacuum boiler vessel 10 while heat is applied thereto. The vacuum boiler vessel 10 is sealed when its pressure is reduced blow ambient pressure. Alternatively, a vacuum pump 7 may be connected to the condensate return pipe 22.

A burner pipe 12 extends from the lower portion of the vacuum boiler vessel 10 so as to transmit heat from a burner 11 to the water contained in the lower portion of the vacuum boiler vessel 10. The burner pipe 12 is of a conventional construction and may, for example, be of the type in which combustion gas is returned.

A fuel system includes a fuel control valve opened and closed by means of a thermometer which is provided in the upper portion or steam chamber of the boiler vessel. An air control valve is also provided to control the flow of air. The fuel control valve and the air control valve cooperated to adjust operative condition of the burner 11.

The condenser vessel 20 is separated from the vacuum boiler vessel 10 and connected to the upper portion or steam chamber of the vacuum boiler vessel 10 by a steam conduit 21. The lower portion of the condenser vessel 20 is connected to the lower portion of the vacuum boiler vessel 10 by a condensate return pipe 22. Thus, the pressure of the condenser vessel 20 as well as the vacuum boiler vessel 10 is maintained at a level below the ambient pressure. The condenser vessel 20 also includes a set of heat transfer tubes 24 through which LNG to be heated flows.

The set of pipes 24 is composed of a multiplicity of U-shaped pipes of identical size which are arranged in parallel. The heat transfer tubes 24 are coupled to a LNG feed pipe 6 through a control valve. LNG in the tubes 24 is heated by steam introduced into the condenser vessel 20 and then evaporated to natural gas (NG).

The condensate return pipe 22 has a noncondensable gas collector in the form of a heat exchanger to effect heat exchange between steam and a cooling medium.

Such a heat exchanger may be of any conventional construction as far as it functions to effect heat exchange between steam and a cooling medium.

With this arrangement, heat is transmitted from the burner 11 to the burner pipe 12 so as to boil water at a pressure below ambient pressure. The water is then vaporized as steam. The steam thus made is introduced through the steam conduit 21 to the condenser vessel 20. While the steam is being condensed, the resultant heat is transmitted to the heat transfer tubes 24 so as to increase the temperature of LNG in liquid phase. As a result of heat exchange, the steam becomes condensate. The condensate or water is then returned to the vacuum boiler vessel 10 through the condensate return pipe 22.

The noncondensable gas collector or the heat exchanger 23 is included in the condensate return pipe 22 to collect noncondensable gas. Thus, noncondensable gas in the steam is prevented from being settled in the heat exchange pipes 24 in the course of heat exchange.

According to the first embodiment of the invention, the vacuum boiler vessel 10 and the condenser vessel 20 are separated from one another and connected to each other by the steam conduit 21. The condensate return pipe 22 extends between the vacuum boiler vessel 10 and the condenser vessel 20 and is provided with the noncondensable gas collector or heat exchanger 23. Noncondensable gas can be collected in the noncondensable gas collector 23 to prevent settlement of noncondensable gas on the heat transfer tubes 24. Heat exchange can thus be effected as it should be to ensure heat transfer between steam and LNG in the pipes.

The noncondensable gas may be cyclically discharged from the heat exchanger while heat exchange takes place at the heat transfer tubes. This results in stable and effective heat exchange.

A second embodiment of the invention will now be described with reference to FIG. 2.

As shown in FIG. 2, a vacuum boiler type evaporator generally includes a vacuum boiler vessel 10 and a condenser vessel 20 connected to the vacuum boiler vessel 10. Water 2 is contained in the vacuum boiler vessel 10 and serves as a heating medium. In order to reduce the pressure of the boiler vessel down to a predetermined level blow ambient pressure, air is removed from the boiler vessel 10 while heat is applied thereto. The boiler vessel 10 is sealed when its pressure is reduced blow ambient pressure. Alternatively, a vacuum pump 7 may be connected to the boiler vessel 10.

A burner pipe 12 extends from the lower portion of the boiler vessel 10 so as to transmit heat from a burner 11 to the water contained in the lower portion of the boiler vessel 10. The burner pipe 12 is of a conventional construction and may, for example, be of the type in which exhaust gas is returned.

A fuel system includes a fuel control valve opened and closed by means of a thermometer which is provided in the upper portion or steam chamber of the boiler vessel. This adjusts the condition of combustion in the burner 11.

The condenser vessel 20 is separated from the vacuum boiler vessel 10 and connected to the upper portion or steam chamber of the boiler vessel 10 by a steam conduit 21. The lower portion of a noncondensable gas collector 28 is connected to the lower portion of the vacuum boiler vessel 10 by a condensate return pipe 22. Thus, the pressure of the noncondensible gas collector 28 is maintained at a level below ambient pressure as in the vacuum boiler vessel 10. The condenser vessel 20 also includes a set of heat transfer pipes 24 through which LNG to be heated flows.

The set of tubes 24 is composed of a multiplicity of U-shaped pipes of identical size which are arranged in parallel. The heat transfer pipes 24 are coupled to a LNG feed pipe 6 through a control valve. LNG in the tubes 24 is heated by steam introduced into the condenser vessel 20 and then evaporated to natural gas (NG).

The heat transfer pipes 24 are in the form of U-shaped pipes of identical size and arranged in parallel. Some of the tubes 24 are longer than or project from the other pipes to provide noncondensable gas collector tubes 31.

The noncondensable gas collector tubes 31 may be arranged, for example, at constant intervals.

A partition 26 in the condenser vessel 20 separates it into first and second chambers 27 and 28, the second chamber 28 constituting a noncondensable gas collector for receiving the noncondensable gas collector tubes 31.

With this arrangement, heat is transmitted from the burner 11 to the burner pipe 12 so as to boil water at a pressure below ambient pressure. The water is then vaporized to steam. The steam thus made is introduced through the steam conduit 21 to the condenser vessel 20. The heat transfer of steam condensation is transmitted to the heat transfer pipes 24 so as to increase the temperature of LNG in liquid phase. As a result of heat exchange, the steam becomes condensate. The condensate or water is then returned to the boiler vessel 10 through the noncondensable gas collector 28 and the condensate return pipe 22.

While steam is fed through the steam conduit 21 so as to contact the heat transfer tubes 24, noncondensable gas contained in the steam can be collected by the noncondensable gas collector tubes 31 which project from the rest of the heat exchange tubes 24. This inhibits settlement of such noncondensable gas in the heat transfer tubes 24.

According to the second embodiment of the invention, the vacuum boiler vessel 10 and the condenser vessel 20 are separated from one another and connected to each other by the steam conduit 21. Further, part of the heat transfer tubes 24 in the condenser vessel 20 project form the rest of the heat transfer tubes. By this arrangement, when steam is fed through the steam conduit, noncondensable gas in the steam is collected in the extended U-shaped tubes. The rest of the heat transfer tubes 24 are free of noncondensable gas. Heat exchange can thus be effected as it should be to ensure heat transfer between steam and LNG.

The noncondensable gas may be cyclically discharged from the heat exchanger while heat exchange takes place at the heat transfer tubes. This results in stable and effective heat exchange.

Advantages of the present invention is as follows.

In the present invention thus far described, the vacuum boiler vessel and the condenser vessel are separate from one another. The stem conduit is provided to feed steam from the boiler vessel to the condenser vessel. Also, the condensate return pipe is provided to deliver condensate from the condenser vessel to the vacuum boiler vessel. Additionally, there is provided means for removing noncondensable gas from the condenser vessel. This results in a substantial decrease in the amount of noncondensable gas which may otherwise be settled in the pipes in the condenser vessel. The heat transfer tubes are thus free of ice and enables effective heat exchange. The temperature of gas at the outlet of the pipes becomes constant.

Although preferred embodiment of the present invention have been described in detail, it is to be understood that various changes and modifications may be made therein without departing from the spirit and scope of the invention.

What is claimed is:

1. A vacuum boiler evaporator which comprises:
    a sealed vacuum boiler vessel having a lower tubular portion containing water and an upper portion which defines a steam chamber,
    a separate sealed vacuum condenser vessel which includes a partition that defines a first chamber and a second chamber, said second chamber constituting a noncondensable gas collector,
    a conduit which connects the upper portion of said sealed vacuum boiler vessel with said first chamber of said sealed vacuum condenser vessel,
    a plurality of U-shaped, parallel heat transfer tubes which extend through said first chamber of said sealed vacuum condenser, some of which extend past said partition and into said second chamber as noncondensable gas collector tubes,
    a return pipe which extends from said second chamber of said sealed vacuum condenser vessel to said lower tubular portion of said sealed vacuum boiler vessel,
    a vacuum pump connected to said return pipe, and
    heating means for heating water in said lower portion of said sealed vacuum boiler vessel.

2. A vacuum boiler evaporator according to claim 1, including a heat exchanger in said return pipe.

* * * * *